Feb. 3, 1970  S. HORROCKS  3,493,184
FLUID BED COMMINUTION
Filed Oct. 17, 1966
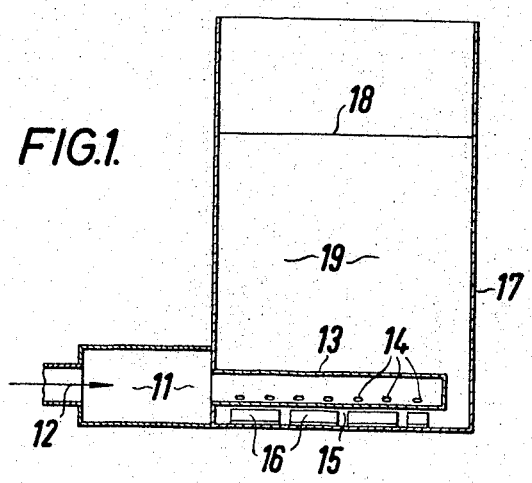
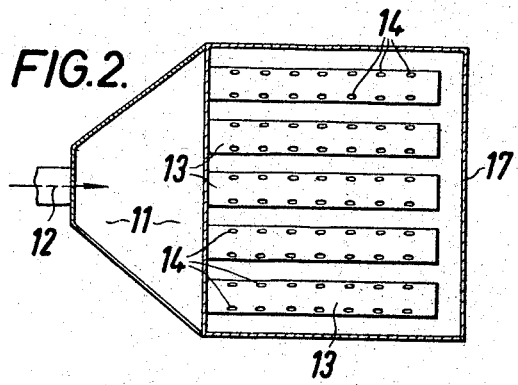
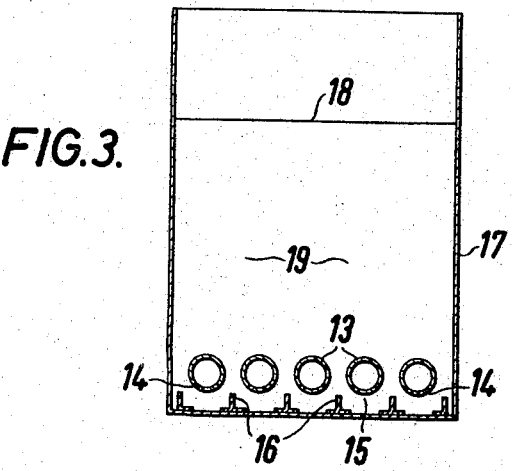
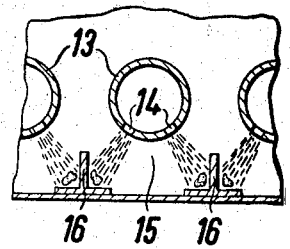
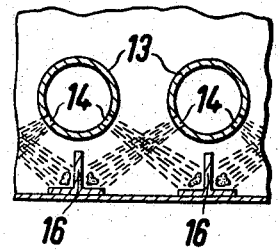
INVENTOR
STANLEY HORROCKS
BY Pearson + Pearson
ATTORNEYS United States Patent Office 3,493,184
Patented Feb. 3, 1970

3,493,184
FLUID BED COMMINUTION
Stanley Horrocks, The Mill House, Lamplugh,
Workington, Cumberland, England
Filed Oct. 17, 1966, Ser. No. 587,026
Claims priority, application Great Britain, Oct. 29, 1965,
45,861/65
Int. Cl. B02c 19/06
U.S. Cl. 241—40            5 Claims

ABSTRACT OF THE DISCLOSURE

A fluidised bed wherein the large particles are broken up at the bottom of the bed by jets of the fluidising gas which issue from a grid injector downwards onto retaining plates which trap the large particles, the grid separating the retaining plates from the fluid bed proper.

---

The invention relates to fluid beds and to a method of and a means for the breaking up of agglomerates formed of the material of the bed.

Fluid beds are well known and are widely used for a variety of industrial processes. Such beds have, for example, been found to be particularly valuable for the reaction of solids with gases and for heating finely divided solids.

However, fluid beds are limited in their application in certain circumstances in view of the tendency in some processes for the average size of the particles to increase and also for agglomeration of particles to occur with the result that a stage is reached at which the bed no longer has a sufficient number of fine particles to support stable and satisfactory fluidisation and the bed collapses and becomes as a solid.

Thus, for example, in the application of the drying and reacting of materials, fluidised beds would have found wider application but for the tendency of moist or sticky particles to adhere to one another thereto form agglomerates which are too large to be supported by the fluidising gas stream.

Again, upon the introduction of large liquid drops into a fluidised bed of substantially dry particles, such drops will become coated with particles and form agglomerates which cannot be supported by the fluidising gas stream. Also, small liquid droplets containing solids in solution, when introduced into a fluidised bed of substantially dry particles, will coat the dry particles causing a slow increase in the average particle size of the fluidized bed, which bed eventually becomes incapable of being sustained in the fluidised condition by the fluiding gas.

Opposing the tendency to agglomerate or the increase in average particle size of the bed is the natural attrition of the particles by collision. This natural attrition can be supplemented by the provision in the bed of high velocity gas jets to increase the attrition rate of particles within the bed either by mutual rubbing action or to impaction onto targets or plates. Further, the attrition rate can be increased by providing mechanical grinding means to combat the agglomeration tendency. The tendency to agglomerate and size enlargement cannot always be overcome by the known methods of accelerating attrition, and it is the primary object of the present invention to provide an alternative and indeed a more satisfactory method and means.

According to the present invention, a method of maintaining a fluid bed in a fluid state comprises subjecting the agglomerates and/or large particles which tend to cause collapse of the bed to the action of jets of particles moving at high velocity to break up said agglomerates and/or large particles, which particles are actuated by the fluidising gas.

Also, according to the invention, apparatus for carrying out the above method comprises a compartment adapted to contain the fluid bed, a fluidising gas injector for injecting jets of fluidising gas into said compartments where agglomerates and/or large particles tend to collect and retaining means adapted to hold said agglomerates and/or large particles in the paths of said jets so that said agglomerates and/or large particles can be broken up by smaller particles contained in said jets.

The invention will now be described further, by way of example only, with reference to the sectional accompanying drawings illustrating two embodiments thereof and in which:

FIG. 1 is a diagrammatic sectional side elevation of a fluid bed constructed according to the invention;

FIG. 2 is an inverted plan view of the gas inlet tubes of the fluid bed;

FIG. 3 is a part elevation of the arrangement shown in FIG. 1;

FIG. 4 is a view, to a larger scale, of a part of FIG. 3; and

FIG. 5 is a view corresponding to FIG. 4 of an alternative arrangement.

Referring now to the drawings and in particular to FIGS. 1 to 4, a fluid bed apparatus consists of a gas injector comprising a manifold 11, provided with an inlet 12 for fluidising gases, such inlet leading to a number of spaced, parallel tubes 13, having holes 14 therein for emitting the fluidising gas to the attrition zone 15, retaining means in the form of vertically and horizontally disposed wear or baffle plates 16 being distributed on the bottom of the container 17, the fluidised bed being shown at 18 and the fluidising zone at 19. The wear plates are of T-section as shown.

When the apparatus is in operation agglomerates or particles not supported by the fluidizing gas gravitate into the attrition zone 15, from the fluidization zone 19, passing between the tubes 13. In attrition zone 15, the agglomerates are constrained from complete random movement on the bottom of the container 17, by the wear or baffle plates 16.

The fluidizing gas which is admitted to the attrition or disintegration zone 15, via inlet 12, mainfold 11, tubes 13 and through holes 14, entrains particles of solids which are in random motion around the outside of the tubes 13, and directs a jet of entrained particles at the agglomerates which are moving in a restricted manner in the attrition zone 15, the movement being controlled by the wear or baffle plates 16.

The jets of entrained particles bombard the agglomerates and large particles, causing the attrition and ultimate disintegration thereof such agglomerates or particles subsequently becoming capable of being fluidized by the fluiding gas and becoming part of the main fluidized bed once again. The entrained particles in the jets will also be attrited by impact with agglomerates or large particles and in this way a useful amount of very fine particles can be created which will serve to increase the efficiency of fluidization. Since the fine particles are created in the attrition zone 15, such particles will become well mixed with particles in the fluidization zone 19 and thus to minimize their chances of being entrained out of the fluidized bed 18 with the fluiding gas.

Further, the jets of entrained particles which are directed at the wear or baffle plates, when there are no agglomerates or large particles present in such zone 15, will impact on the wear or baffle plates 16, and be attrited, again providing fine particles to sustain the efficiency of fluidization.

In the alternative arrangement shown in FIG. 5, the jets of entrained particles as produced by adjacent tubes 13 cross, the jets in adjacent tubes being staggered axially of the tubes so as to avoid direct interference between the jets of adjacent tubes and furthermore being directed at the baffle 16 disposed below the next adjacent tube.

By locating the baffles below the tubes the agglomerates can gravitate freely from zone 19 to zone 15 unimpeded by the vertical members of the wear or baffle plates.

With this arrangement, the bed 18 can be maintained fluid for much longer than heretofore, and as fluid beds are usually used for producing solids from liquids, much more of the solid can be produced. The difficulty of the bed collapsing by clogging due to large particles or agglomerates has been much obviated.

The invention is not restricted to the particular features of the arrangement hereinbefore disclosed since alternatives will readily present themselves to one skilled in the art.

What I claim is:

1. Apparatus for maintaining a fluid bed in a fluid state by subjecting the agglomerates and/or large particles in the fluid bed which tend to cause collapse of the bed to the action of jets of particles moving at high velocity comprising a compartment adapted to contain the fluid bed, a fluidizing gas injector for injecting jets of fluidizing gas downwards into said compartment at the bottom thereof where agglomerates and/or large particles tend to collect and wear plates in the bottom of the compartment adapted to hold said agglomerates and/or large particles in the paths of said jets so that said agglomerates and/or large particles can be broken up by smaller particles contained in said jets.

2. Apparatus according to claim 1, in which the wear plates are angle irons and have horizontal and vertical limbs, there being pockets between adjacent vertical limbs in which the agglomerates and/or large particles collect.

3. Apparatus according to claim 2, in which each wear plate is of T-section.

4. Apparatus according to claim 2, in which the injector is a series of parallel tubes with holes from which the jets issue on the undersides and the wear plates are parallel to each other and to the tubes.

5. Apparatus according to claim 1, in which the injector is a series of parallel tubes with holes from which the jets issue on the undersides and the wear plates are parallel to each other and to the tubes.

References Cited

UNITED STATES PATENTS

| | | | |
|---|---|---|---|
| 3,311,307 | 3/1967 | Lopker | 241—39 X |
| 2,487,088 | 11/1949 | Andrews | 241—5 X |
| 2,789,942 | 4/1957 | Cooper et al. | 241—39 X |
| 2,874,095 | 2/1959 | Boisture et al. | 241—40 X |
| 2,949,245 | 8/1960 | Faulk | 241—5 |

FRANK T. YOST, Primary Examiner

U.S. Cl. X.R.

241—42